June 7, 1932.    F. W. PETERS    1,861,814
MEANS FOR CONNECTING ROTATABLE MEMBERS
Filed May 1, 1930
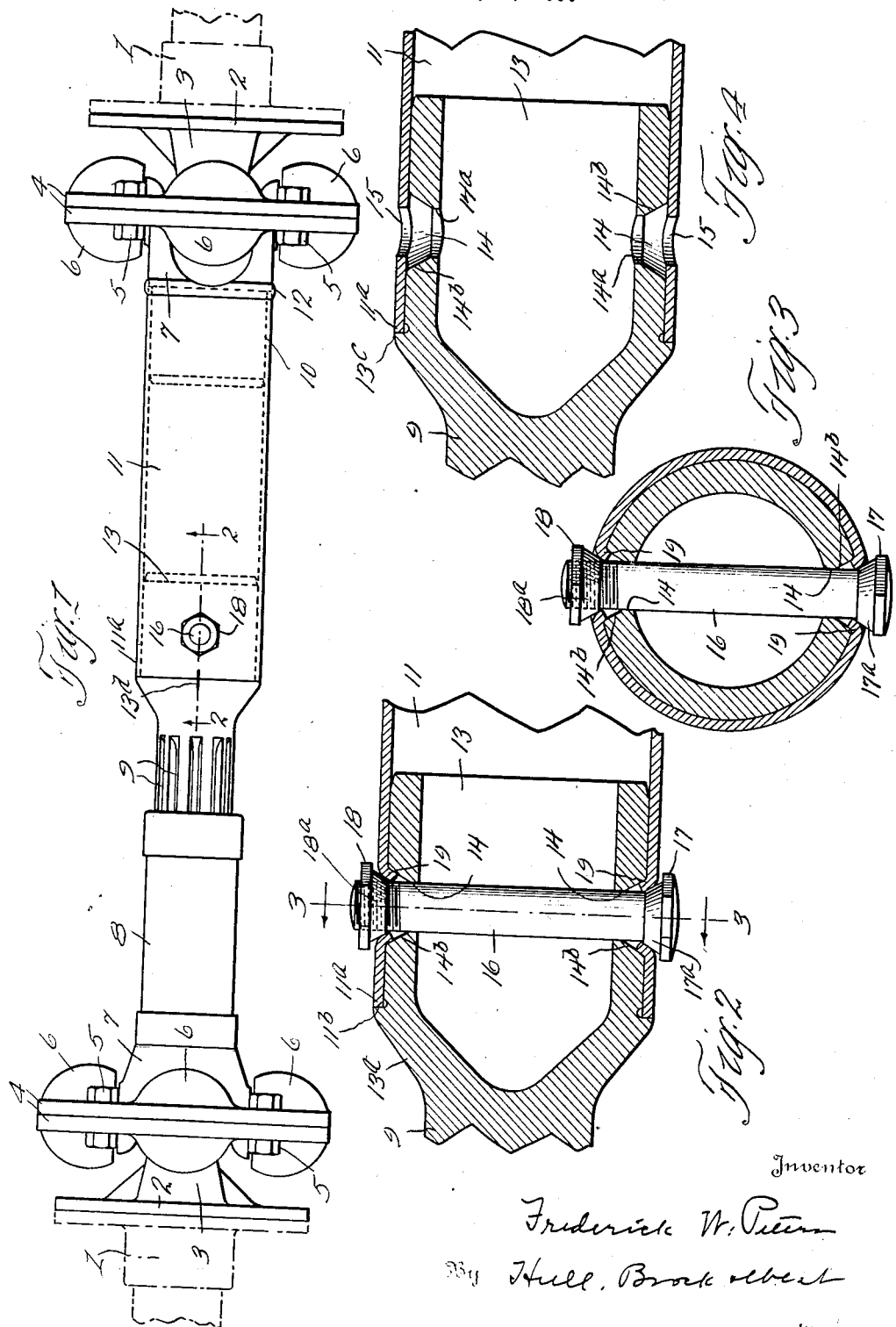

Patented June 7, 1932

1,861,814

UNITED STATES PATENT OFFICE

FREDERICK W. PETERS, OF CLEVELAND, OHIO, ASSIGNOR TO THE ALMETAL UNIVERSAL JOINT COMPANY, OF CLEVELAND, OHIO, A CORPORATION OF OHIO

MEANS FOR CONNECTING ROTATABLE MEMBERS

Application filed May 1, 1930. Serial No. 448,854.

This invention relates to means for connecting a hollow member, such as the hub of the spline shaft of a flexible or universal joint, with a tubular casing, such as a portion of a propeller shaft.

It is the general purpose and object of the invention to provide means whereby two members of the character described may be quickly, conveniently, and effectively assembled and wherein the connecting means will provide a joint or union capable of withstanding indefinitely all of the ordinary incidents of use.

I accomplish the foregoing objects in and through the construction and arrangement of parts shown in the drawing, wherein—

Fig. 1 represents an elevation showing a pair of universal joints or flexible connections wherein the spline shaft of one of the said joints or connections is connected to a hollow shaft or casing in accordance with my invention; Fig. 2 is an enlarged detail in section corresponding to the line 2—2 of Fig. 1; Fig. 3 is a detail in section corresponding substantially to the line 3—3 of Fig. 2; and Fig. 4 is a view similar to Fig. 2, showing the arrangement of the hub and surrounding casing prior to the application of the coupling bolt thereto.

Describing the various parts by reference characters, 1, 1 denote the hubs of the members of two separated, flexible or universal joints and 2 the flanges and 3 the yokes of one member of each of the said joints. The joints shown herein are of the connecting-ring type, the ring sections being indicated at 4 and providing, when coupled by the bolts 5, chambers 6 for bearing blocks or bushings (not shown), which receive the ordinary trunnions (not shown) projecting from the yoke arms 3 and from the opposing yoke arms 7. Each pair of opposing yoke arms 7 is carried by a hub, the hub at the left side of Fig. 1, being an elongated hub 8, which receives therewithin the spline shaft 9. The hub 10 which carries the yoke arms at the right hand side of Fig. 1 is shown as a short hub fitting within a hollow shaft section 11.

The parts thus far described may be of any ordinary or standard construction and, in their details, constitute no part of the invention intended to be protected herein. The right hand end of the hollow shaft 11 may be connected in any desired manner with the hub 10, as by a welded joint, indicated at 12.

The spline shaft 9 is provided with a hub 13 shown as formed integral with the spline shaft, the hub proper being of greater diameter than the spline shaft and there being a frusto-conical connecting portion $13^a$ interposed between the body of the spline shaft and the hub proper. This frusto-conical portion terminates in an annular shoulder $13^b$, the plane of which is at right angles to the axis of the spline shaft and hub, the external diameter of the hub proper 13 being of sufficiently smaller diameter than the diameter of the periphery of the shoulder $13^b$ to enable the hollow shaft 11 to be slipped over the hub proper and to abut against the shoulder $13^b$, the outer surface of said hollow shaft being shown substantially flush with the periphery of said shoulder.

In order to provide an efficient and economical connection between the hub and the hollow shaft 11, I first provide the hub with a pair of diametrically opposed openings 14, each opening having a short inner cylindrical wall $14^a$ communicating with the interior of the hub and a longer outwardly flaring frusto-conical wall $14^b$ extending to the outer surface of the hub. The wall $14^b$ preferably makes an angle of about 30° with the axis of the opening and an angle of about 60° with the axis of the hub. The walls $14^a$ are preferably of the same diameter as the connecting bolt which is employed to secure the hub and shaft together.

The hollow shaft 11 is provided with diametrically opposing openings 15, located at the proper distance from the end $11^a$ of such shaft to bring the centers of such openings in line with the centers of the openings 14; and the diameter of each opening 15 is preferably equal to the diameter of the bolt and of the cylindrical portion $14^a$ of each opening 14.

In order to facilitate the assembling of the hollow shaft and hub, indexing marks may be provided on diametrically opposite sides of the part 13ᶜ of the hub adjacent to the shoulder 13ᵇ, as shown at 13ᵈ (Fig. 1), and the hollow shaft or sleeve 11 may be then slipped in place and the holes 15 punched therein, using the hub as a support. The shaft and hub having been assembled and the holes 15 punched as described, the parts are then connected by means of a special bolt 16 having at one end a head 17 provided with a frusto-conical portion 17ᵃ which merges with the shank of the bolt. The body of the bolt is preferably of the same diameter as that of the openings 14 and 15, and the inclination of the portion 17ᵃ of the head is the same as the inclination of the walls 14ᵇ of the openings 14. At its opposite end, the bolt is provided with the usual thread for the reception of a nut 18 which has a frusto-conical portion 18ᵃ of the same dimensions and inclination as the portion 17ᵃ of the bolt head. By fitting the bolt in place and tapping on the head 17 and meanwhile setting up the nut 18, the metal surrounding the openings 15 will be drawn radially inwardly with respect to the hub and into engagement with the walls 14ᵇ, as shown clearly in Figs. 2 and 3, the parts so drawn in being indicated at 19 and forming flanged keys integral with the shaft for coupling the latter to the hub.

By connecting the parts in the manner described, it will be evident that I have secured an effective driving connection between the spline shaft and the hollow shaft 11 as well as accomplishing such connection in an extremely simple and economical manner.

Having thus described my invention, what I claim is:

1. The combination, with a hollow hub-like member having openings therethrough, each opening having an outwardly flaring wall extending to the outer surface thereof, of a rotatable sleeve-like member applied to the exterior surface of the said hub-like member and having openings therethrough adapted to register with the openings in the hub-like member, the openings in the sleeve-like member being each of materially less diameter than the diameter of the outer end of the corresponding opening in the hub-like member, and a bolt extending through the said openings and having at one end a head having an outwardly flaring portion complementary to the outwardly flaring portion of the corresponding opening in the hub-like member and at its opposite end a nut having an outwardly flaring portion complementary to the outwardly flaring portion of the corresponding opening in the hub-like member, whereby, on setting up the nut, the metal surrounding each of the openings in the sleeve-like member will be pressed inwardly into engagement with the outwardly flaring surfaces of the corresponding openings in the hub-like member and the bolt will serve as a driving key between the sleeve-like member and the hub-like member.

2. The combination, with a hollow hub-like member having substantially diametrically opposed openings therethrough, each opening having an outwardly flaring frusto-conical wall extending to the outer surface thereof, of a rotatable sleeve-like member applied to the exterior surface of the said hub-like member and having openings therethrough adapted to register with the openings in the hub-like member, the openings in the sleeve-like member being each of materially less diameter than the diameter of the outer end of the corresponding opening in the hub-like member, and a bolt extending through the said openings and having at one end a head having a frusto-conical portion complementary to the frusto-conical portion of the corresponding opening in the hub-like member and at its opposite end a nut having a frusto-conical portion complementary to the frusto-conical portion of the corresponding or cooperating opening in the hub-like member, the said head and nut engaging and forcing the metal surrounding the openings in the sleeve-like member into engagement with the frusto-conical portions of the openings in the hub-like member and the said bolt operating as a driving key between the sleeve-like member and the hub-like member.

3. The combination, with a hollow hub-like member having substantially diametrically opposed openings therethrough, each opening having an outwardly flaring wall extending to the outer surface thereof and at least one of said openings being frusto-conical, of a rotatable sleeve-like member applied to the exterior surface of the said hub-like member and having openings therethrough adapted to register with the openings in the hub-like member, the openings in the sleeve-like member being each of materially less diameter than the diameter of the outer end of the corresponding opening in the hub-like member, and a bolt extending through the said openings and having at one end a head having an outwardly flaring portion complementary to the outwardly flaring portion of the corresponding opening in the hub-like member and at its opposite end a nut having a frusto-conical portion complementary to the frusto-conical portion of the corresponding opening in the hub-like member, the said head and nut engaging and forcing the metal surrounding the openings in the sleeve-like member into engagement with the outwardly flaring portions of the openings in the hub-like member and the said bolt operating as a driving key between the sleeve-like member and the hub-like member.

In testimony whereof, I hereunto affix my signature.

FREDERICK W. PETERS.